(12) United States Patent
Matsumoto

(10) Patent No.: US 6,548,799 B1  
(45) Date of Patent: Apr. 15, 2003

(54) CONTACT-TYPE IMAGE SENSOR HAVING PROTRUSIONS FORMED ON A PLATE

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 90 days.

(21) Appl. No.: 09/670,991

(22) Filed: Sep. 26, 2000

(30) Foreign Application Priority Data

May 16, 2000 (JP) ........................................ 2000-143132

(51) Int. Cl.⁷ ............................................... H01L 27/00
(52) U.S. Cl. ..................................... 250/208.1; 358/483
(58) Field of Search ................... 250/208.1; 358/471, 358/474, 483, 493, 494, 496, 482, 484; 348/294

(56) References Cited

U.S. PATENT DOCUMENTS

| | | |
|---|---|---|
| 5,038,027 A | 8/1991 | Ioka |
| 5,182,445 A | 1/1993 | Yamashita |
| 5,233,178 A * | 8/1993 | Tokunaga ............... 250/208.1 |
| 5,489,992 A * | 2/1996 | Endo ....................... 250/208.1 |
| 5,949,062 A | 9/1999 | Matsumoto |
| 6,111,244 A | 8/2000 | Wang |

FOREIGN PATENT DOCUMENTS

| JP | 4-086366 | 7/1992 |
|---|---|---|
| JP | 5-083469 | 4/1993 |
| JP | 6-018814 | 1/1994 |

* cited by examiner

*Primary Examiner*—Stephone B. Allen  
*Assistant Examiner*—Bradford Hill  
(74) *Attorney, Agent, or Firm*—Oblon, Spivak, McClelland, Maier & Neustadt, P.C.

(57) ABSTRACT

In a contact-type image sensor according to the present invention, a protrusion is formed in a transparent plate, a recess is formed in a sensor frame, and the transparent plate is engaged with the sensor frame so that the heights of surfaces of the transparent plate and the sensor frame on sides of conveying a manuscript are substantially the same. In conventional techniques, it was necessary to bend a manuscript conveying path because of different heights of a protrusion of the frame and the transparent plate. Further, even though the heights of the sensor frame and the transparent plate are the same, a contact portion therebetween forms an angle, whereby a contact surface is not brought into close contact alone an entire length of an image sensor, and gaps are partially formed in the contact surface. Therefore, at time of cleaning a surface of the transparent plate using a solvent such as alcohol to remove dirt on the transparent plate, the solvent and extraneous matters intrude inside the image sensor from the gaps, a passage of light is obstructed, and therefore light-and-shadow information of an image of the manuscript was not correctly transmitted to sensor.

4 Claims, 4 Drawing Sheets

PRIOR ART

PRIOR ART

CONTACT-TYPE IMAGE SENSOR HAVING PROTRUSIONS FORMED ON A PLATE

BACKGROUND OF THE INVENTION

1. Field of the Invention

The present invention relates to a contact-type image sensor used for an image input section of a facsimile machine and so on.

2. Discussion of Background

FIG. 6 is a cross-sectional view of a conventional image sensor disclosed in Japanese Unexamined Patent Publication JP-A-6-18814. In FIG. 6, numerical reference 10a designates a manuscript guiding path; numerical reference 20 designates a linear light source, in which LED chips are linearly arranged; numerical reference 30 designates an erect 1× magnification-image-forming rod lens array including a plurality of rod lenses (not shown); numerical reference 40 designates a sensor board; numerical reference 50 designates a sensor ICs, which are linearly arranged on the sensor board 40; numerical reference 60a designates a transparent plate positioned on a manuscript guiding surface; numerical reference 70 designates a frame; and numerical reference 70a designates a protrusion being a part of the frame 70 and fixing the transparent plate 60a to the frame. Numerical reference 80 designates a path of a light emitted from the linear light source 20, which light forms an image in the sensor ICs 50; and numerical reference 90 designates a roller conveying a manuscript.

In the next, an operation will be described. A light from the linear light source 20 passes thought the transparent plate 60a and illuminates the manuscript. The illuminating light is reflected by the manuscript along the light path 80 in response to light-and-shade information of an image. The reflected light passes through the rod lens of the rod lens array 30 and forms an image in the sensor ICs 50. The sensor ICs 50 accumulate electric charges in response to the intensity of the reflected light and outputs image data through the sensor board 40.

As illustrated in FIG. 6, the height of the surface on a side of guiding the manuscript of the transparent plate 60a and the height of the protrusion 70a of the frame are different.

FIG. 7 is a cross-sectional view of a conventional image sensor illustrated in Japanese Unexamined Utility Model Publication JP-A-4-86366. The same numerical references are used for constitutional elements same as those in FIG. 6. Numerical reference 10b designates a manuscript conveying path. A protrusion 70b fixes the transparent plate 60a in a manner similar to that illustrated in FIG. 6. A surface of the transparent plate 60a on a side of guiding the manuscript and the height of the protrusion 70b of the frame are different.

FIG. 8 is a cross-sectional view of a conventional image sensor disclosed in Japanese Unexamined Patent Publication JP-A-5-83469. The same numerical references are used for constitutional elements same as those of the image sensor illustrated in FIG. 6. Numerical reference 10c designates a manuscript conveying path. A transparent plate 60b has a chamfer, and an angle of a protrusion 70c of the frame is determined in correspondence with an angle of the chamfer.

In FIG. 8, the height of the frame 70 is same as the height of a surface of the transparent plate 60b on a side of guiding the manuscript. However, because of a dimensional tolerance of contact surfaces between the frame 70 and the transparent plate 60b, the transparent plate 60b warps in a direction toward the manuscript. Therefore, it is difficult to bring the protrusion 70c of the frame and the transparent plate 60b into close contact along an entire length of an image sensor extending in a vertically going away direction on FIG. 8, whereby gaps are partially formed between the frame 70 and the transparent plate 60b.

The conventional contact-type image sensor is constructed as described above, wherein there are problems that a conveying mechanism is difficult to design because it is necessary to bend the conveying passage of the manuscript when the protrusion of the frame does not have a height same as that of the surface of the transparent plate, on which the manuscript is conveyed, whereby the manuscript is easily jammed.

Further, when the height of the protrusion of the frame is same as the height of the surface of the transparent plate, on which the manuscript is conveyed, it becomes difficult to bring the contact portion between the frame and the transparent plate into close contact along the entire length of the image sensor because of dimensional tolerances of various contact surfaces between the protrusion and the transparent plate, the warp of the transparent plate in a longitudinal direction, and so on, whereby gaps are partially formed between the frame and the transparent plate. Therefore, when dust intrudes from the gaps by vibration of the roller at time of conveying the manuscript, or the surface of the plate is cleaned by a solvent, such as alcohol, to remove dirt of the transparent plate, an extraneous matters intrude into an inside along with the solvent from the gaps, whereby there are problems that the extraneous matters interrupt a path of light and the light-and-shade information of the image of the manuscript is not correctly transferred to the sensor ICs.

SUMMARY OF THE INVENTION

It is an object of the present invention to solve the above-mentioned problems inherent in the conventional technique and to provide a contact-type image sensor, which can prevent a manuscript from jamming dust, a solvent and extraneous matters from intruding into the image sensor even though there is dimensional tolerances, a warp of a plate, or the like, and correctly transmits light-and-shadow information of an image of the manuscript to a sensor IC.

According to a first aspect of the present invention, there is provided a contact-type image sensor comprising: a plate positioned in a manuscript guiding path, which plate has at least a transparent portion; a light source illuminating a manuscript through the transparent portion of the plate; a frame holding the plate; and a lens receiving a light reflected by the manuscript and forming an image in a sensor IC, wherein a recess formed in the frame is engaged with a protrusion formed in the plate, and the heights of surfaces of the frame and the plate on sides of guiding the manuscript are substantially the same.

According to a second aspect of the present invention, there is provided the contact-type image sensor, wherein the protrusion of the plate is formed such that at least two plates or more are attached to both ends of the plate, positioned on a manuscript guiding surface, so as to protrude from the both ends.

According to a third aspect of the present invention, there is provided the contact-type image sensor, wherein the protrusion of the plate is formed such that two plates having different widths are overlapped and attached to the plate so that steps engaging with the recess are formed on both sides of the plate.

According to a fourth aspect of the present invention, there is provided a contact-type image sensor comprising: a plate positioned in a manuscript guiding path, which plate has at least a transparent portion; a light source illuminating the manuscript through the transparent portion of the plate; a frame holding the plate; and a lens receiving a light reflected by the manuscript to form an image in a sensor Ic, wherein a recess formed in the frame and a protrusion formed in the plate are engaged, a surface of the frame on a side of inserting the manuscript is higher than the plate, and a surface of the frame on a side of ejecting the manuscript is lower than the plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIG. 1 through 5 as follows, wherein the same numerical references are used for the same or similar portions and descriptions of these portions is omitted.

Embodiment 1

Figure 1:
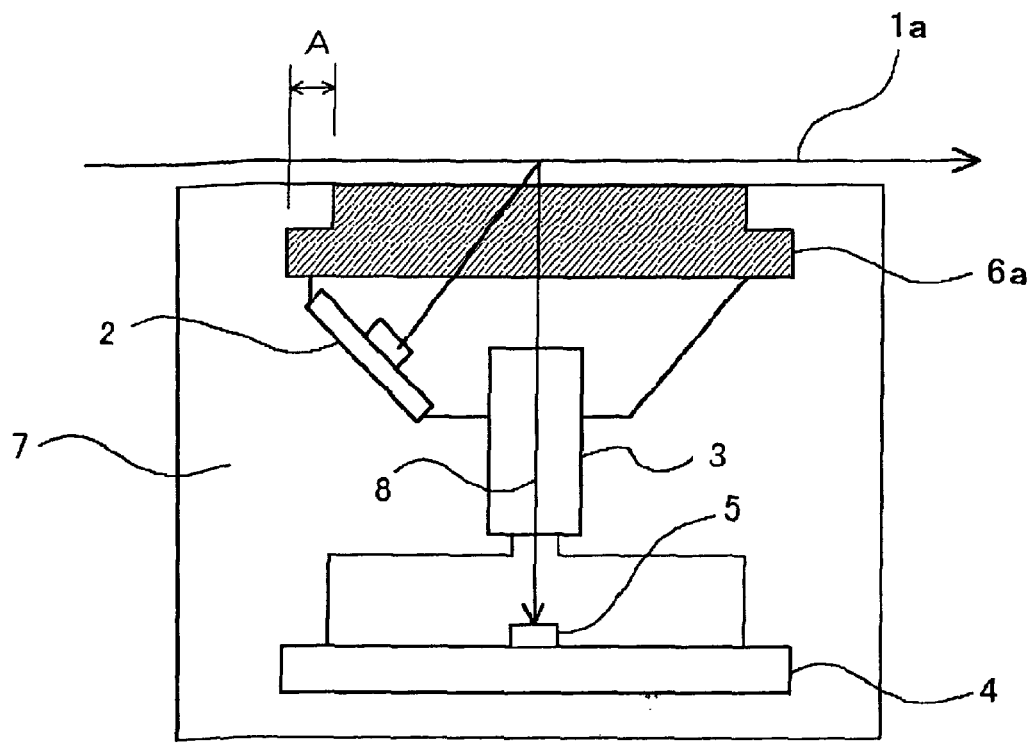
FIG. 1 is a cross-sectional view of a contact-type image sensor according to Embodiment 1 of the present invention.

FIG. 1 is a cross-sectional view of a contact-type image sensor according to Embodiment 1 of the present invention. In FIG. 1, numerical reference 1a designates a manuscript guiding path. A manuscript is transferred to a direction of an arrow 1a. Numerical reference 2 designates a linear light source formed by linearly arranging LED chips. Numerical reference 3 designates an erect 1× magnification-image-forming rod lens array. Numerical reference 4 designates a sensor board. Numerical reference 5 designates sensor ICs linearly arranged on the sensor board 4. Numerical reference 6a designates a transparent plate positioned on a manuscript guiding surface, which transparent plate is made of glass or plastic such as an acryl resin. Numerical reference 7 designates a frame. A protrusion is formed in the plate 6a, and a recess engaged with the protrusion is formed in the frame 7. When the plate 6a and the frame 7 are engaged, the frame 7 is fixed, and a step of the plate 6a is inserted in the recess of the frame 7 from a closer side of FIG. 1. The heights of surfaces of the plate 6a and the frame 7 on sides of guiding the manuscript are substantially the same. Numerical reference 8 designates a passage of a light emitted from the linear light source 2 and forming an image in the sensor ICs 5.

Without using a bond between the frame 7 and the plate 6a and engaging the protrusion of the plate 6a with the recess of the frame 7, which frame has no slanted portion, it is possible to easily exchange the plate 6a in a case such that the passage 8 of the light is obstructed by a scar formed in the plate 6a at time of reading the manuscript by the contact-type image sensor.

Further, it is possible to increase a contact area between the plate 6a and the frame 7 in comparison with the conventional techniques because an engaging portion of the plate 6a is the protrusion without the slant. Therefore, even though there are dimensional tolerances of a contact surface and a warp of the plate 6a, it is possible to prevent intrusion of dust, a solvent, extraneous matters, and so on since a path of these to the contact-type image sensor is elongated. Further, it is possible to easily increase the contact area by increasing a length A of the step.

When, in the conventional techniques, contact surfaces are increased, it is necessary to reduce an angle of chamfer of the plate with respect to the manuscript guiding surface. Accordingly, new problems such as an increment of the dimensional tolerances caused by reducing the strength of the protrusion of the frame and the angle of the chamfer. By engaging the frame 7 and the plate 6a through the step, problems of the strength and so on can be canceled, and a larger contact surface is obtainable in comparison with a case that the contact surface is slanted.

As described, in accordance with Embodiment 1, because the protrusion in the plate 6a and the recess in the frame 7 are engaged, it is possible to make the manuscript guiding path straight, whereby dust, a solvent, extraneous matters, and so on do not easily intrude into the frame 7. Thus, the image sensor correctly transmitting light-and-shade information of an image of a manuscript to the sensor ICs 5 is obtainable.

Embodiment 2

Figure 2:
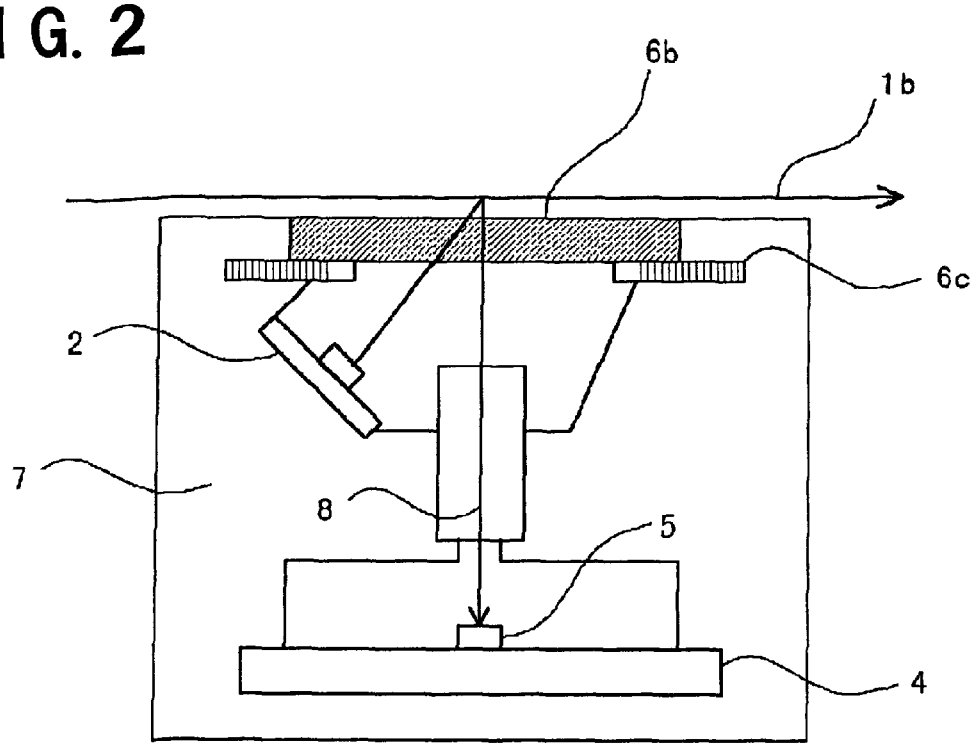
FIG. 2 is a cross-sectional view of a contact-type image sensor according to Embodiment 2 of the present invention.

FIG. 2 is a cross-sectional view of a contact-type image sensor according to Embodiment 2 of the present invention. The same numerical references are used for the same constitutional elements as those in Embodiment 1. In FIG. 2, numerical reference 1b designates a manuscript conveying path. A transparent plate 6b is a plate positioned on a manuscript guiding surface, which plate is made by processing a glass or a plastic such as acryl resin. Numerical reference 6c designates a plate attached to the plate 6b, which plate is not necessarily transparent. The heights of surfaces of the plate 6b and the frame 7 on sides of conveying a manuscript are substantially the same.

On both ends of the transparent plate 6b, the plates 6c are attached so as to protrude from the both ends as illustrated in FIG. 2. By engaging a recess formed in the frame 7 and the protrusion protruded from the both ends, the transparent plate 6b is fixed. For example, an assembly of the transparent plate 6b and the plates 6c is engaged with the frame 7 such that the frame 7 is fixed, and the assembly of the transparent plate 6b and the plates 6c is inserted in a vertically going away direction on FIG. 2.

Figure 3:
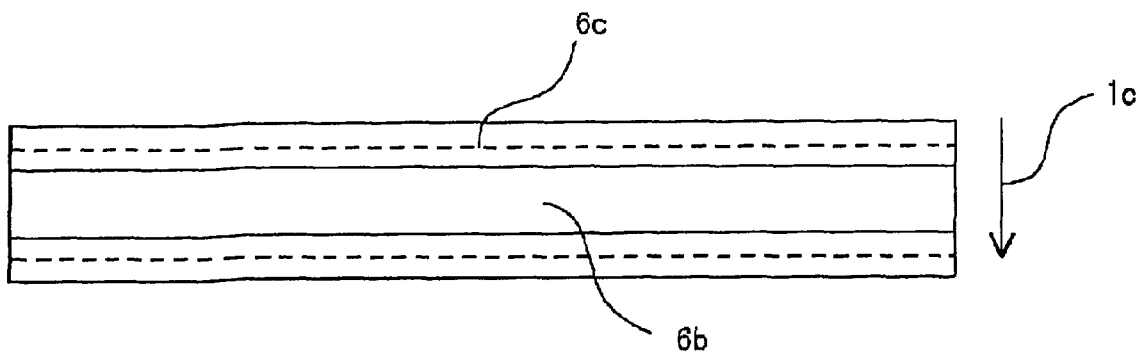
FIG. 3 is a view of a transparent plate of the contact-type image sensor according to Embodiment 2 of the present invention observed from a lower side of the transparent plate.

FIG. 3 schematically shows an example of a method of attaching the transparent plate 6b to the plates 6c. FIG. 3 is viewed from a lower side of the transparent plate 6b and the plates 6c. Numerical reference 1c designates a guiding direction of the manuscript. Two of the plates 6c having lengths same as those of the transparent plate 6b are used to attach to the transparent plate 6b.

The transparent plate 6b is attached to the plates 6c by a bond or a tackifier, and the plates 6c are not positioned in a passage 8 of light.

As described, in Embodiment 2, the plates 6c are attached to the transparent plate 6b so that the plates 6c are protruded from the both ends of the transparent plate 6b, and the recess is formed in the frame 7 so as to be engaged with the protrusion. Therefore, it is possible to make the manuscript guiding path 1b straight, dust, a solvent, extraneous matters, and so on do not easily intrude into the image sensor, and light-and-shade information of an image of the manuscript can be correctly transmitted to sensor ICs 5.

Embodiment 3

Figure 4:
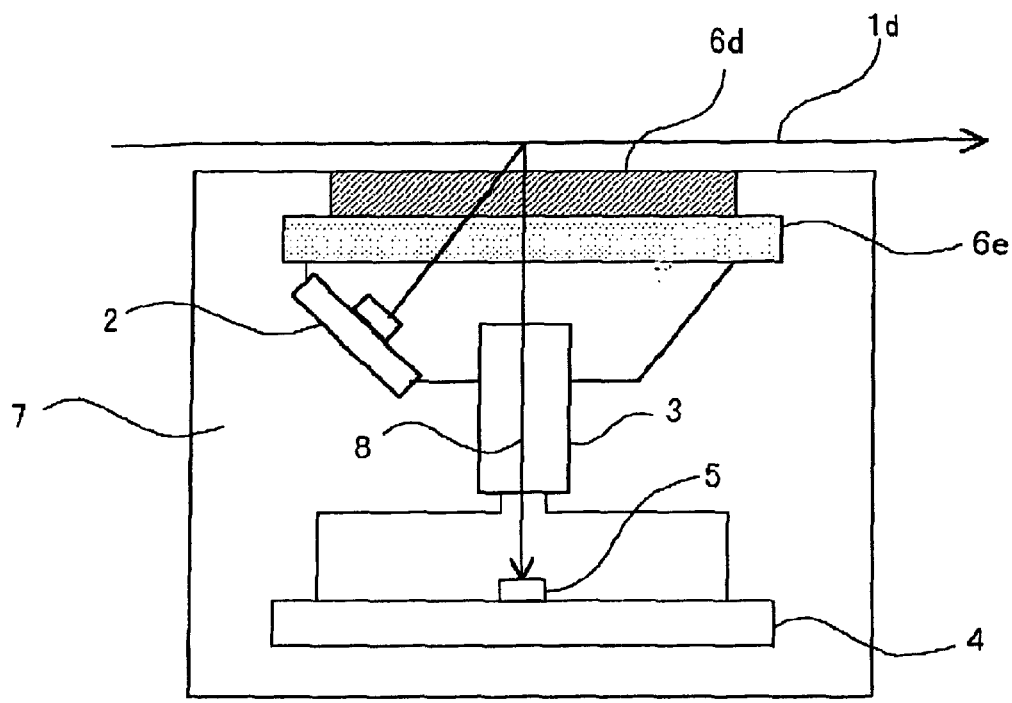
FIG. 4 is a view of a transparent plate of a contact-type image sensor according to Embodiment 3 of the present invention observed from a lower side of the transparent plate.

FIG. 4 is a cross-sectional view of a contact-type image sensor according to Embodiment 3 of the present invention. The same numerical references are used for constitutional elements same as those described in Embodiment 1. In FIG. 4, numerical reference 1d designates a manuscript conveying path; numerical reference 6d designates a transparent plate positioned on a manuscript guiding surface; and numerical reference 6e designates a transparent plate attached to the transparent plate 6d. The plates 6d and 6e are made by processing a glass or a plastic such as acryl resin.

A wide plate is used as the plate 6e, which is not positioned on the manuscript guiding surface. The plates 6d and 6e are attached so that the plate 6e protrudes from both ends of the plate 6d. Meanwhile, a recess is formed in a frame 7 so as to be engaged with the protrusion, whereby the transparent plate is fixed. For example, the assembly of the plate 6d and the plate 6e is engaged with the frame 7 such that the frame 7 is fixed, and the assembly of the plate 6d and the plate 6e is inserted in a vertically going away direction on FIG. 5. The heights of surfaces of the plate 6d and the frame 7 on sides of guiding the manuscript are substantially the same.

The plate 6d is attached to the plate 6e in use of a transparent bond or a transparent tackifier so as not to obstruct a passage 8 of light.

As described, in Embodiment 3, the plate 6e is protruded from the both ends of the plate 6d at time of attaching the plate 6d to the plate 6e, and the assembly is engaged with the recess formed in the frame 7. Therefore, it is possible to make the manuscript conveying path straight, a solvent, extraneous matters, and so on do not easily intrude into the image sensor, and light-and-shadow information of an image of the manuscript can be correctly transmitted to sensor ICs 5.

Embodiment 4

Figure 5:
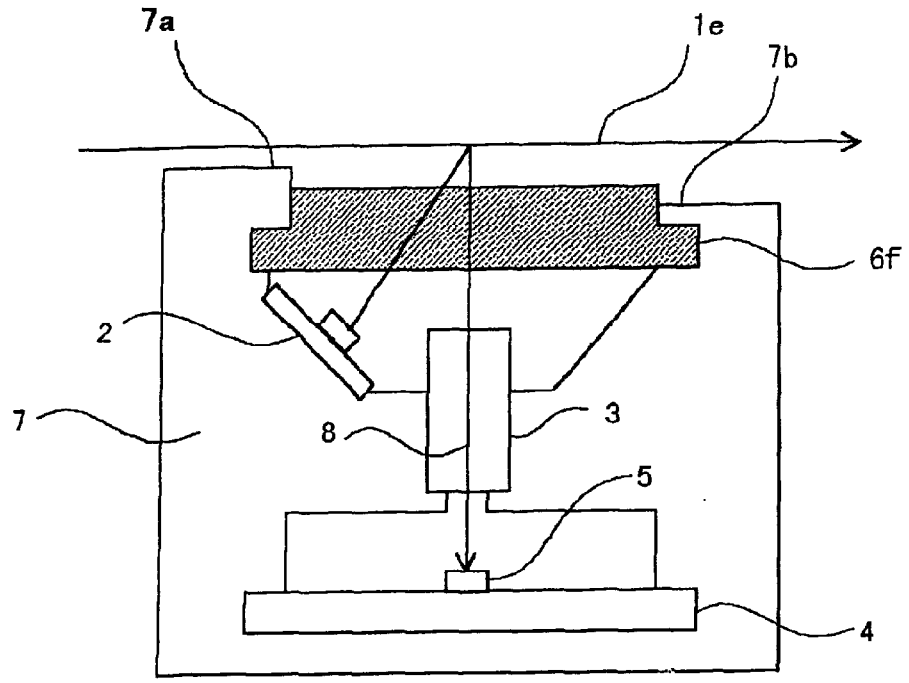
FIG. 5 is a cross-sectional view of a contact-type image sensor according to Embodiment 4 of the present invention.
Figure 6:
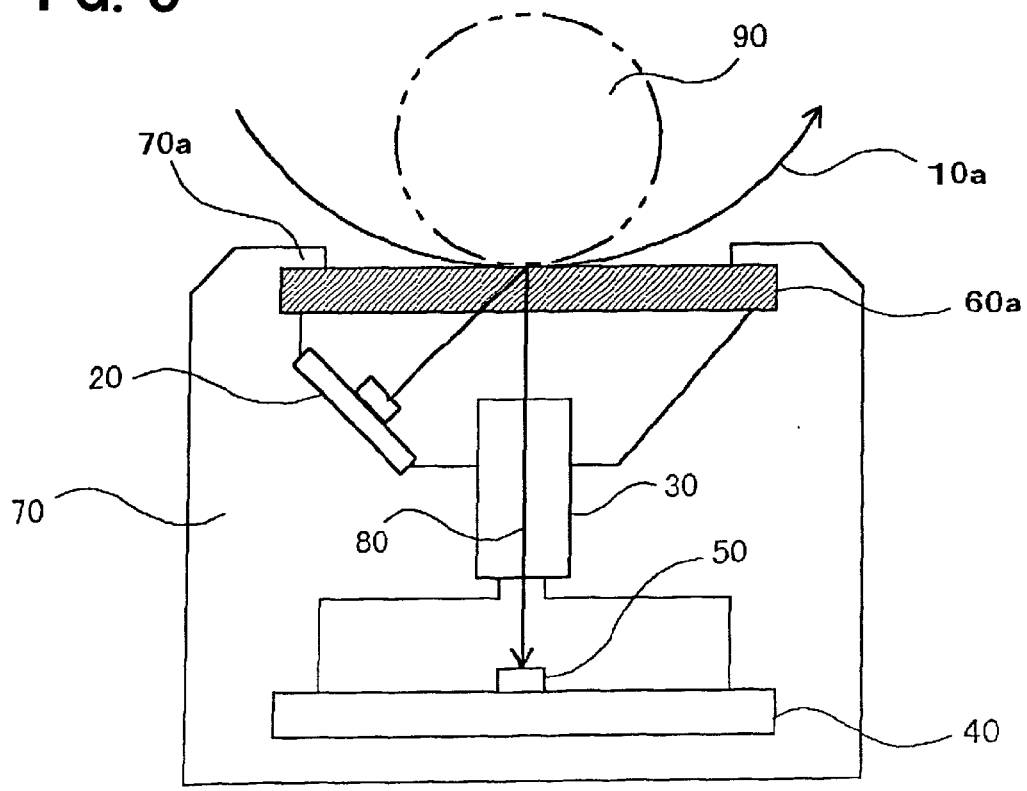
FIG. 6 is a cross-sectional view of a conventional contact-type image sensor.
Figure 7:
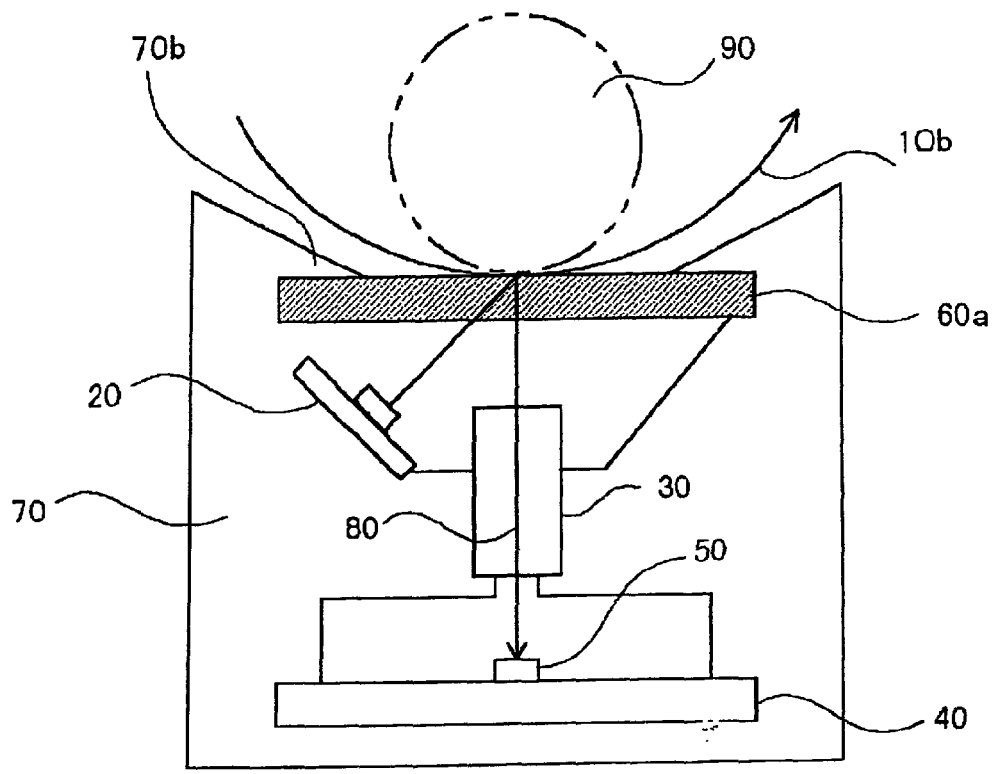
FIG. 7 is a cross-sectional view of a conventional contact-type image sensor.
Figure 8:
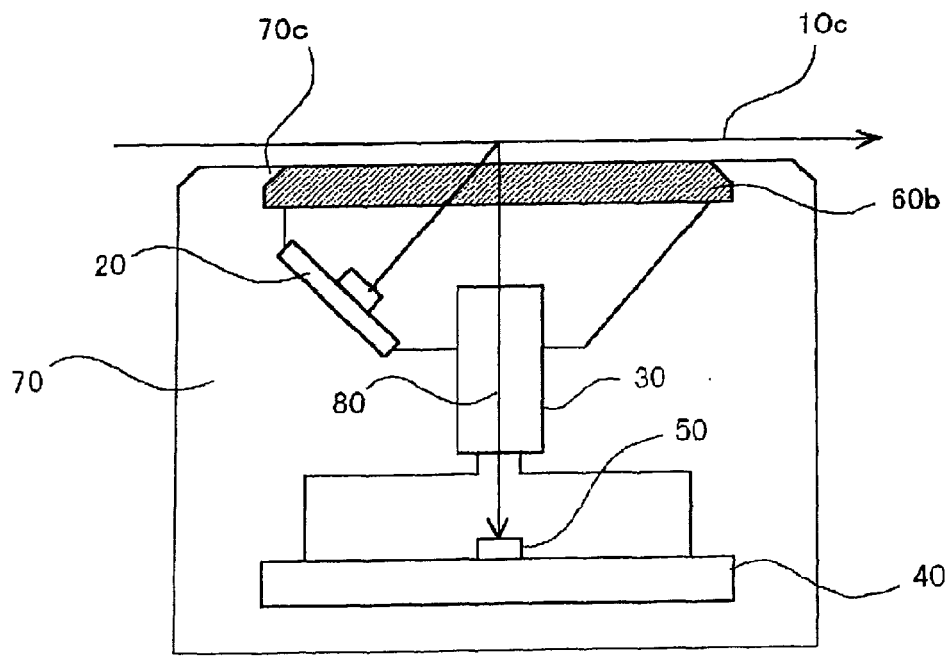
FIG. 8 is a cross-sectional view of a conventional contact-type image sensor.

FIG. 5 is a cross-sectional view of a contact-type image sensor according to Embodiment 4 of the present invention. The same numerical references are used for constitutional elements same as those described in Embodiment 1. In FIG. 5, numerical reference 1e designates a manuscript conveying path; numerical reference 6f designates a plate positioned on a manuscript guiding surface and having at least a transparent portion; numerical reference 7a designates a protrusion of a frame being a part of the frame 7 and positioned on a side of inserting a manuscript; and numerical reference 7b designates a protrusion of the frame 7 on a side of ejecting the manuscript.

By forming a protrusion in the plate 6f and a recess in the frame 7, and engaging the protrusion and the recess, the transparent plate is fixed. For example, the plate 6f is engaged with the frame 7 by fixing the frame 7, and inserting the plate 6f in a vertically going away direction on FIG. 5. The height of a surface of the protrusion 7a of the frame 7 is higher than the height of a surface of the plate 6f on a side of guiding the manuscript. The height of a surface of the frame 7b is lower than the height of the surface of the plate 6f on the sides of guiding the manuscript.

As described, since the heights of the protrusion 7a of the frame, the transparent plate, and the protrusion 7b of the frame are gradually lowered toward a side of inserting the manuscript to a side of ejecting the manuscript, it is possible to smoothly convey the manuscript without jamming the manuscript. Further, dust, a solvent, extraneous matters, and so on do not easily intrude into the image sensor, and light-and-shadow information of an image of the manuscript is correctly transmitted to sensor ICs 5.

Meanwhile, the plate 6f may be any one of the transparent plates described in Embodiments 1, 2 and 3.

The advantages of the contact-type image sensor according to the present invention is that it is possible to make the manuscript guiding path straight, dust, a solvent, extraneous matters, and so on do not easily intrude, and light-and-shadow information of an image of a manuscript can be correctly transmitted to the sensor ICs.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 12-143132 filed on May 16, 2000 including specification, claims, drawings and summary are incorporated herein by reference in its entirety.

What is claimed is:

1. A contact-type image sensor comprising:
   a removably mounted plate positioned in a manuscript guiding path, the plate having at least a transparent portion;
   a light source illuminating a manuscript through the transparent portion of the plate;
   a frame holding the plate; and
   a lens receiving a light reflected by the manuscript and forming an image in a sensor,
   wherein a recess formed in the frame is engaged with a stepped-shaped protrusion formed in the plate such that the recess completely surrounds the stepped-shaped protrusion to securely engage the removably mounted plate, and
   wherein heights of surfaces of the frame and the plate on sides of the manuscript guiding path are substantially the same.

2. The contact-type image sensor according to claim 1, wherein
   the protrusion of the plate is formed such that at least two plates or more are attached to both ends of the plate, positioned on a manuscript guiding surface, so as to protrude from the both ends.

3. The contact-type image sensor according to claim 1, wherein
   the protrusion of the plate is formed such that two plates having different widths are overlapped and attached to the plate so that steps engaging with the recess are formed on both sides of the plate.

4. A contact-type image sensor comprising:
   a removably mounted plate positioned in a manuscript guiding path, the plate having at least a transparent portion;
   a light source illuminating the manuscript through the transparent portion of the plate;
   a frame holding the plate; and a lens receiving a light reflected by the manuscript to form an image in a sensor, wherein a recess formed in the frame and a stepped-shaped protrusion formed in the plate are engaged such that the recess completely surrounds the stepped-shaped protrusion to securely engage the removably mounted plate, and wherein a surface of the frame on a side of inserting the manuscript is higher than the plate, and a surface of the frame on a side of ejecting the manuscript is lower than the plate.

\* \* \* \* \*